(12) United States Patent
Kitamura

(10) Patent No.: US 12,514,520 B2
(45) Date of Patent: Jan. 6, 2026

(54) INTRAORAL IMAGE CAPTURING DEVICE

(71) Applicant: HAMAMATSU PHOTONICS K.K., Hamamatsu (JP)

(72) Inventor: Shigehiro Kitamura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 279 days.

(21) Appl. No.: 18/271,263

(22) PCT Filed: Dec. 20, 2021

(86) PCT No.: PCT/JP2021/047022
§ 371 (c)(1),
(2) Date: Jul. 7, 2023

(87) PCT Pub. No.: WO2022/172599
PCT Pub. Date: Aug. 18, 2022

(65) Prior Publication Data
US 2024/0057954 A1 Feb. 22, 2024

(30) Foreign Application Priority Data

Feb. 15, 2021 (JP) .................................. 2021-021942

(51) Int. Cl.
*A61B 6/42* (2024.01)
*G01T 1/20* (2006.01)
(Continued)

(52) U.S. Cl.
CPC ............ *A61B 6/425* (2013.01); *G01T 1/2002* (2013.01); *G01T 1/2018* (2013.01); *H04N 23/30* (2023.01);
(Continued)

(58) Field of Classification Search
CPC ....... A61B 6/425; A61B 6/512; G01T 1/2002; G01T 1/2018; H04N 23/30; H04N 25/30; H04N 25/709; H04N 25/7795
See application file for complete search history.

(56) References Cited

U.S. PATENT DOCUMENTS

2006/0193436 A1   8/2006 Schick et al.
2011/0317809 A1*  12/2011 Eguchi ................ A61B 6/4283
                                                378/101
(Continued)

FOREIGN PATENT DOCUMENTS

JP     2006288617 A   * 10/2006
JP     2011-216723 A    10/2011
(Continued)

OTHER PUBLICATIONS

International Preliminary Report on Patentability mailed Aug. 24, 2023 for PCT/JP2021/047022.

*Primary Examiner* — Edwin C Gunberg
*Assistant Examiner* — Richard O Toohey
(74) *Attorney, Agent, or Firm* — Faegre Drinker Biddle & Reath LLP

(57) ABSTRACT

An intra-oral imaging device includes: an imager that detects radiation transmitted through an object while being placed in an oral cavity; and a controller that controls the imager while being placed outside the oral cavity. The imager includes an image sensor including a plurality of pixels for acquiring an image of the object. While power is being supplied to the controller, the controller supplies power to the image sensor in an imaging period during which the image sensor performs imaging and stops supplying the power to the image sensor in a standby period during which the image sensor is on standby.

6 Claims, 14 Drawing Sheets

(51) Int. Cl.
*H04N 23/30* (2023.01)
*H04N 25/30* (2023.01)
*H04N 25/709* (2023.01)
*H04N 25/76* (2023.01)

(52) U.S. Cl.
CPC ........... *H04N 25/30* (2023.01); *H04N 25/709* (2023.01); *H04N 25/7795* (2023.01)

(56) References Cited

U.S. PATENT DOCUMENTS

2014/0211922 A1* 7/2014 Kuwabara ................ A61B 6/56
378/97
2020/0106957 A1* 4/2020 Okita ....................... H04N 5/04

FOREIGN PATENT DOCUMENTS

| JP | 5715960 B2 | 5/2015 |
| JP | 2020-057844 A | 4/2020 |
| WO | WO-2010/061086 A1 | 6/2010 |
| WO | WO-2010/073894 A1 | 7/2010 |
| WO | WO-2012/008229 A1 | 1/2012 |
| WO | WO-2013/047489 A1 | 4/2013 |

* cited by examiner

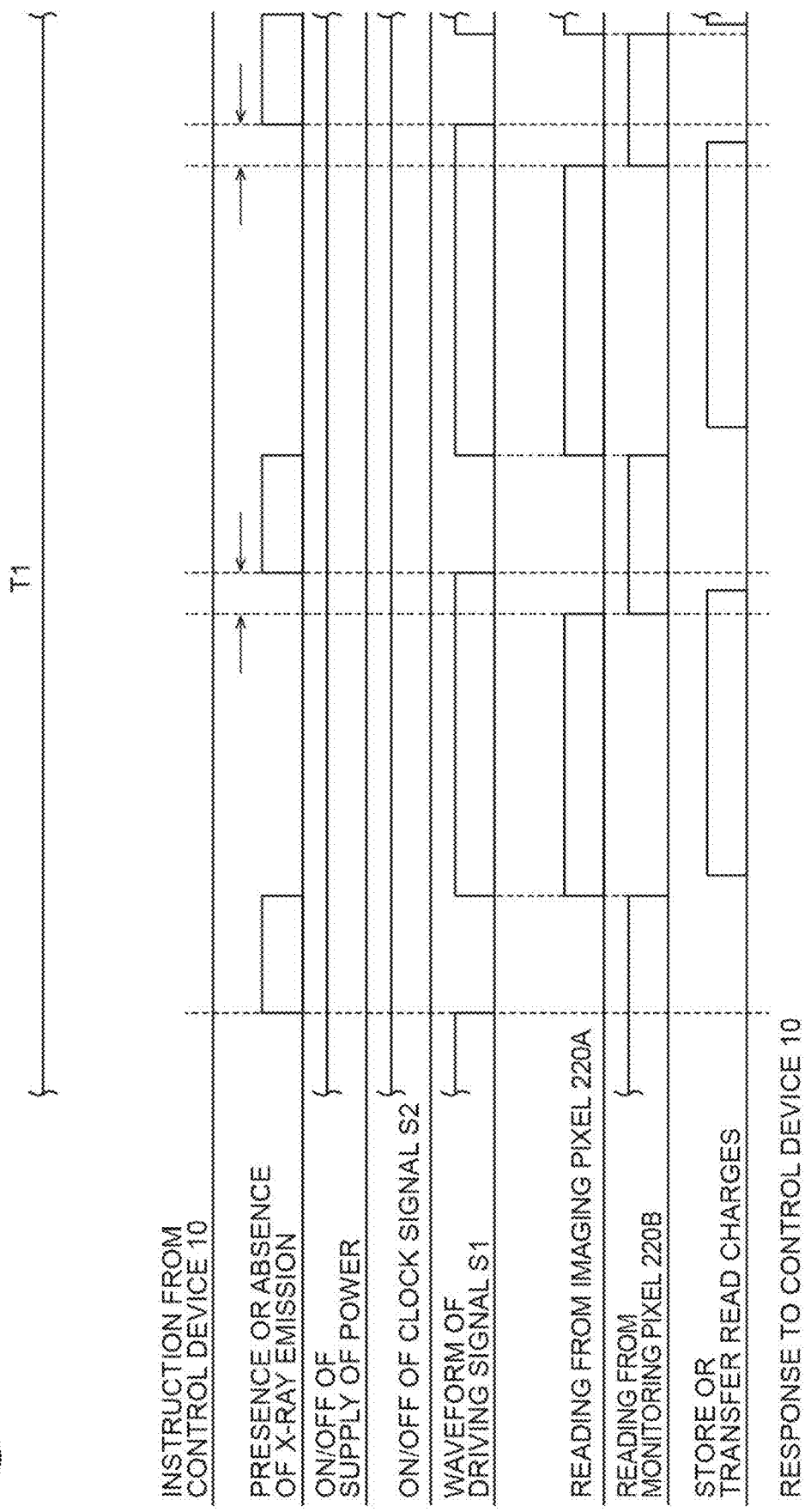

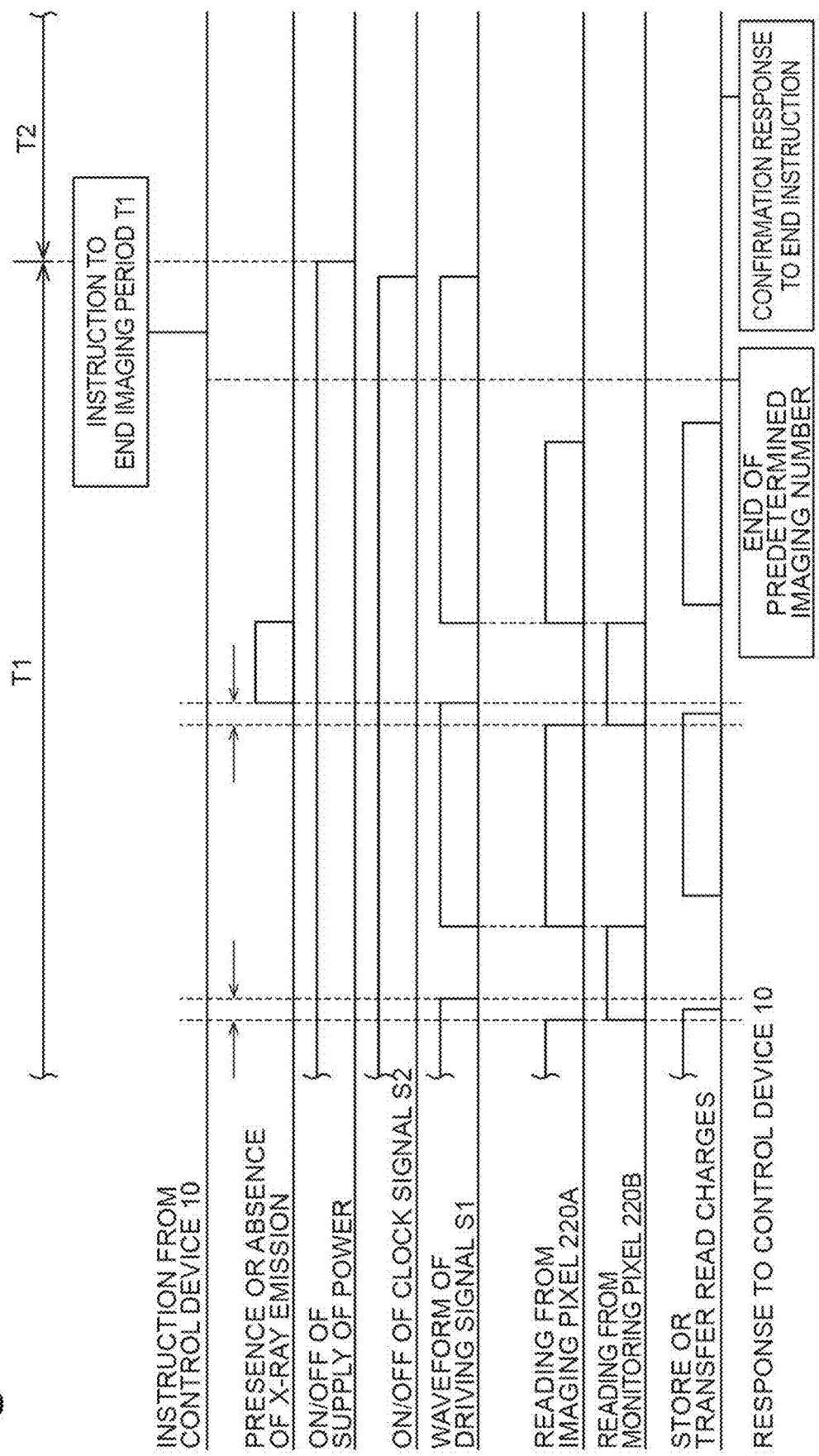

INTRAORAL IMAGE CAPTURING DEVICE

TECHNICAL FIELD

The present disclosure relates to an intra-oral imaging device.

BACKGROUND ART

There is known an intra-oral imaging device including an imager that detects radiation transmitted through an object, such as a tooth, while being placed in the oral cavity and a controller that controls the imager while being placed outside the oral cavity (see, for example, Patent Literature 1).

CITATION LIST

Patent Literature

Patent Literature 1: Japanese Patent No. 5715960

SUMMARY OF INVENTION

Technical Problem

As for the intra-oral imaging device described above, there is an increasing demand for performing imaging at a high frame rate (for example, 3 fps or higher). However, when imaging is performed at a high frame rate, there is a concern that the temperature of the imager placed in the oral cavity will increase.

It is an object of the present disclosure to provide an intra-oral imaging device capable of suppressing an increase in the temperature of an imager placed in the oral cavity, for example, even when imaging is performed at a high frame rate.

Solution to Problem

An intra-oral imaging device according to one aspect of the present disclosure includes: an imager that detects radiation transmitted through an object while being placed in an oral cavity; and a controller that controls the imager while being placed outside the oral cavity. The imager includes an image sensor including a plurality of pixels for acquiring an image of the object. While power is being supplied to the controller, the controller supplies power to the image sensor in an imaging period during which the image sensor performs imaging and stops supplying the power to the image sensor in a standby period during which the image sensor is on standby.

In the intra-oral imaging device according to one aspect of the present disclosure, power is supplied to the image sensor of the imager in the imaging period, and supplying the power to the image sensor of the imager is stopped in the standby period. Therefore, for example, even when imaging is performed at a high frame rate in the imaging period, heat generation of the image sensor is suppressed as compared with a case where power is supplied to the image sensor over the imaging period and the standby period. In addition, since the controller to which power is supplied over the imaging period and the standby period is placed outside the oral cavity, the imager is less likely to be affected by the heat generated by the controller. Therefore, according to the intra-oral imaging device according to one aspect of the present disclosure, for example, even when imaging is performed at a high frame rate, it is possible to suppress an increase in the temperature of the imager placed in the oral cavity.

In the intra-oral imaging device according to one aspect of the present disclosure, the controller may output a driving signal to the image sensor in the imaging period, and stop supplying the driving signal to the image sensor in the standby period. According to this, since the heat generation of the image sensor is more reliably suppressed, it is possible to suppress an increase in the temperature of the imager more reliably.

In the intra-oral imaging device according to one aspect of the present disclosure, the controller may start outputting the driving signal to the image sensor after starting supplying the power to the image sensor in the imaging period. According to this, it is possible to suppress an increase in the load caused by simultaneously starting supplying the power to the image sensor and the output of the driving signal to the image sensor.

In the intra-oral imaging device according to one aspect of the present disclosure, the controller may output a clock signal to the image sensor in the imaging period and stop supplying the clock signal to the image sensor in the standby period. According to this, since the heat generation of the image sensor is more reliably suppressed, it is possible to suppress an increase in the temperature of the imager more reliably.

In the intra-oral imaging device according to one aspect of the present disclosure, the controller may start outputting the clock signal to the image sensor after starting supplying the power to the image sensor in the imaging period. According to this, it is possible to suppress an increase in the load caused by simultaneously starting supplying the power to the image sensor and the output of the clock signal to the image sensor.

In the intra-oral imaging device according to one aspect of the present disclosure, the controller may end supplying the power to the image sensor when at least one condition of an imaging number and an imaging time set for the imaging period is satisfied. According to this, it is possible to reliably end supplying the power to the image sensor when the imaging period ends.

In the intra-oral imaging device according to one aspect of the present disclosure, the image sensor may further include a pixel for monitoring a dose of the radiation. For example, when the pixel for monitoring radiation is provided in a light receiving element different from the image sensor, it is also necessary to separately control supplying power for the light receiving element. However, since the pixel for monitoring the dose of radiation is included in the image sensor, such separate control is not required. Therefore, the configuration and operation of the controller can be further simplified.

In the intra-oral imaging device according to one aspect of the present disclosure, the imager may further include a light receiving element including a pixel for monitoring a dose of the radiation. According to this, since the heat generation of the light receiving element can be sufficiently suppressed, the heat generation of the image sensor can be reliably suppressed, for example, by supplying power or a signal to the image sensor only when radiation is emitted while constantly supplying power to the light receiving element to monitor the dose of radiation.

Advantageous Effects of Invention

According to the present disclosure, it is possible to provide an intra-oral imaging device capable of suppressing an increase in the temperature of an imager placed in the oral cavity, for example, even when imaging is performed at a high frame rate.

BRIEF DESCRIPTION OF DRAWINGS

FIG. 13 is a time chart of third imaging processing.
FIG. 14 is a time chart of third imaging processing.

DESCRIPTION OF EMBODIMENTS

Figure 1:
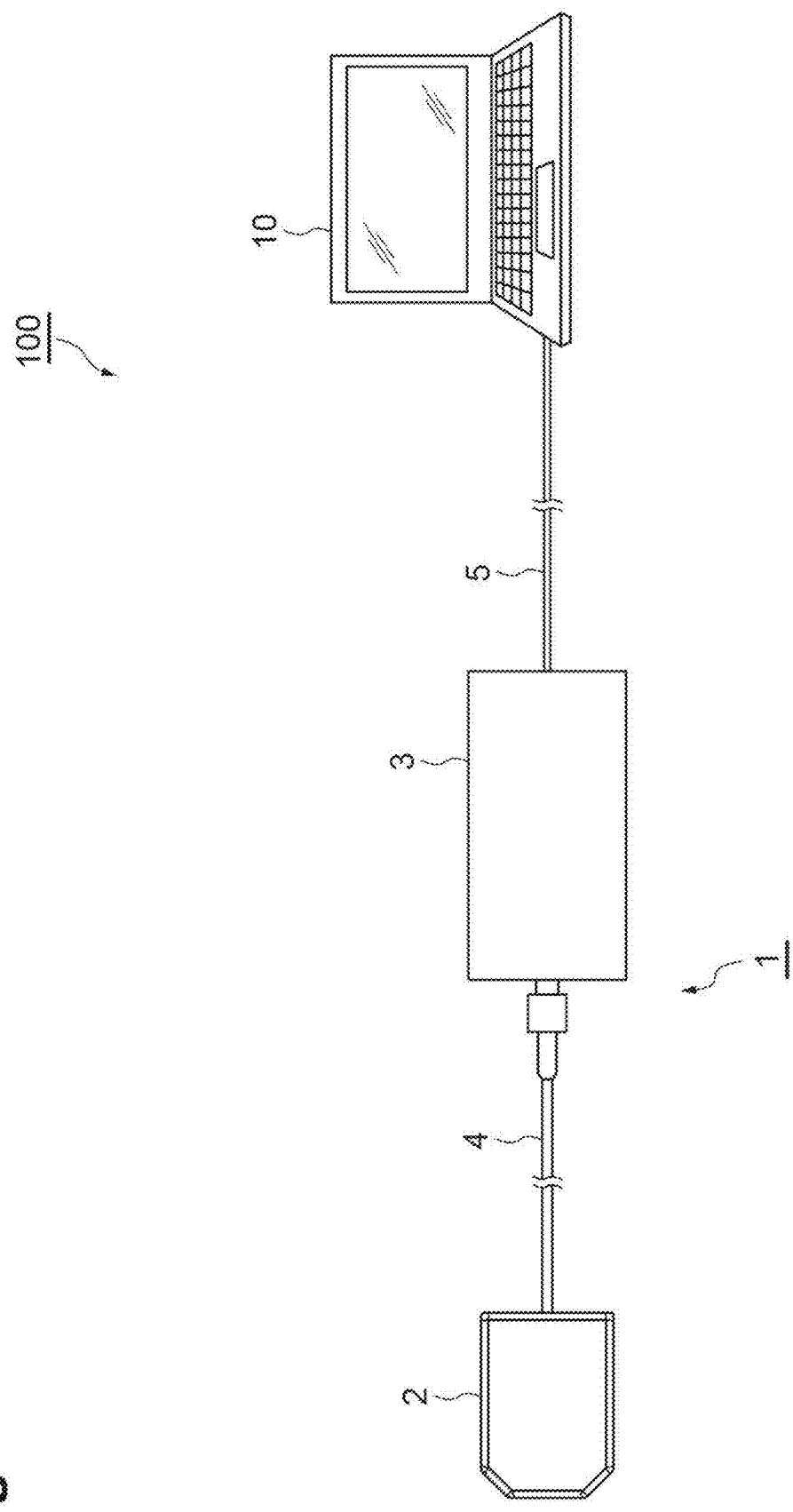
FIG. 1 is a configuration diagram of an intra-oral imaging system according to an embodiment.

Hereinafter, embodiments of the present disclosure will be described in detail with reference to the diagrams. In addition, the same or equivalent portions in the diagrams are denoted by the same reference numerals, and repeated description thereof will be omitted.

[Configuration of Intra-Oral Imaging System]

As shown in FIG. 1, an intra-oral imaging system 100 includes an intra-oral imaging device 1 and a control device 10. The intra-oral imaging device 1 includes an imager 2, a controller 3, a cable 4, and a cable 5. The imager 2 detects radiation (for example, X-rays) transmitted through an object, such as a tooth, while being placed in the oral cavity. The controller 3 controls the imager 2 while being placed outside the oral cavity. The imager 2 is electrically connected to the controller 3 through the cable 4. The imager 2 and the controller 3 transmit and receive signals and the like (that is, perform communication) therebetween through the cable 4. The controller 3 is electrically connected to the control device 10 through the cable 5. The controller 3 and the control device 10 transmit and receive signals and the like (that is, perform communication) therebetween through the cable 5. The cables 4 and 5 are wired cables, for example, USB (Universal Serial Bus) cables. The control device 10 is, for example, a computer device such as a PC or a tablet terminal, and functions as a higher-level controller than the controller 3. In the intra-oral imaging system 100, when radiation transmitted through the object is detected by the imager 2, an electrical signal generated by the radiation detection is transmitted from the controller 3 to the control device 10, and the control device 10 generates an image (radiation transmission image) of the object based on the electrical signal.

[Configuration of Imager]

Figure 2:
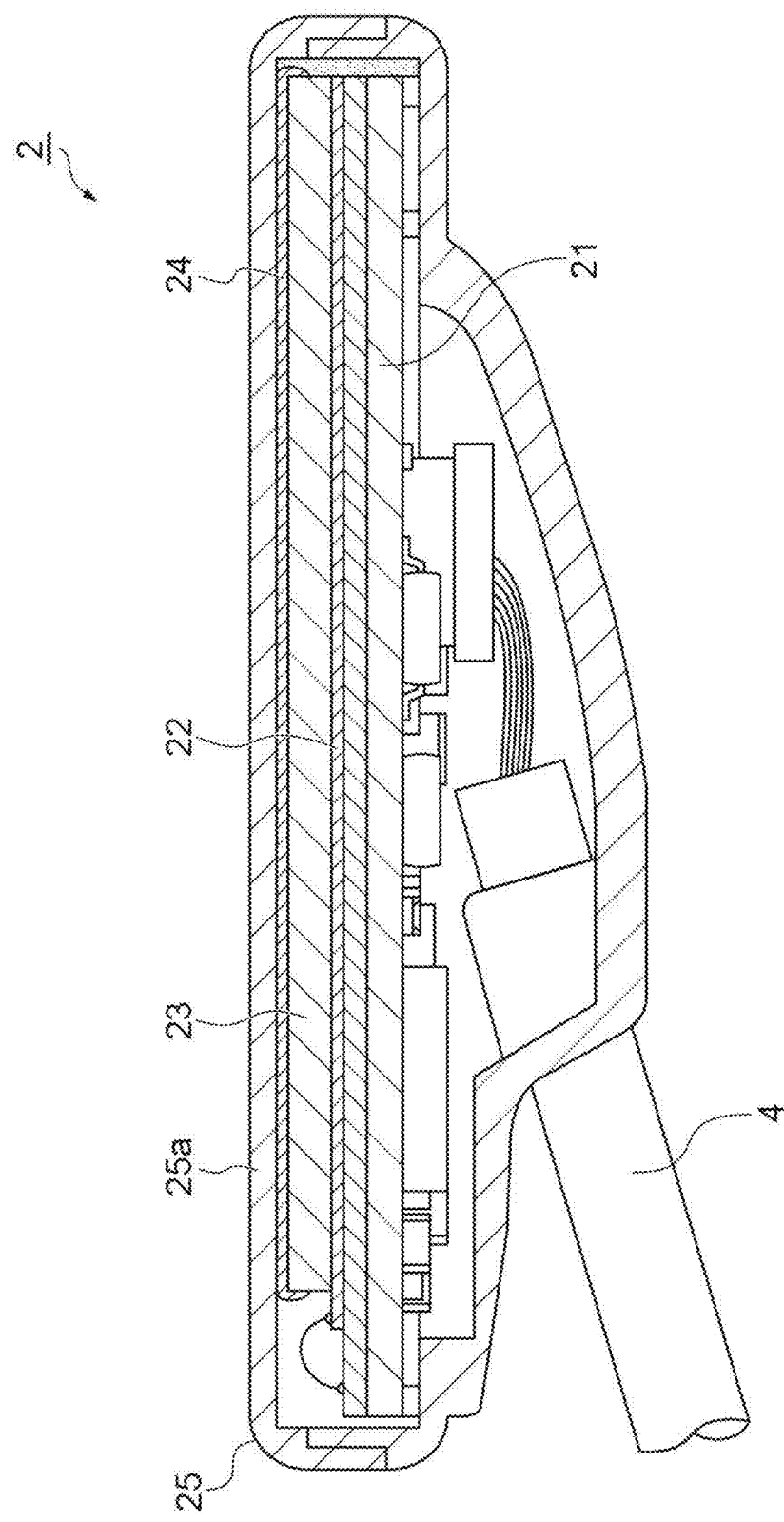
FIG. 2 is a cross-sectional view of an imager shown in FIG. 1.

As shown in FIG. 2, the imager 2 includes a wiring board 21, an image sensor 22, an FOP (Fiber Optical Plate) 23, a scintillator 24, and a case 25. The image sensor 22 is mounted on the wiring board 21. The image sensor 22 is, for example, a solid state imaging device such as a CMOS image sensor. The FOP 23 is arranged on the image sensor 22. The scintillator 24 is arranged on the FOP 23. The wiring board 21, the image sensor 22, the FOP 23, and the scintillator 24 are housed in the case 25. A wall portion 25a along the scintillator 24 among wall portions of the case 25 is a wall portion on which radiation is to be incident. An end portion of the cable 4 passing through a wall portion of the case 25 opposite to the wall portion 25a is electrically connected to the wiring board 21.

In the imager 2 configured as described above, when radiation transmitted through the object passes through the wall portion 25a of the case 25 to be incident on the scintillator 24 in a state in which the case 25 is placed in the oral cavity, fluorescence corresponding to the intensity of the incident radiation is emitted from the scintillator 24. When the fluorescence is guided by the FOP 23 to be incident on the image sensor 22, an electrical signal corresponding to the intensity of the incident fluorescence is generated in the image sensor 22, and the electrical signal is transmitted to the controller 3 through the cable 4.

[Configuration of Controller]

Figure 3:
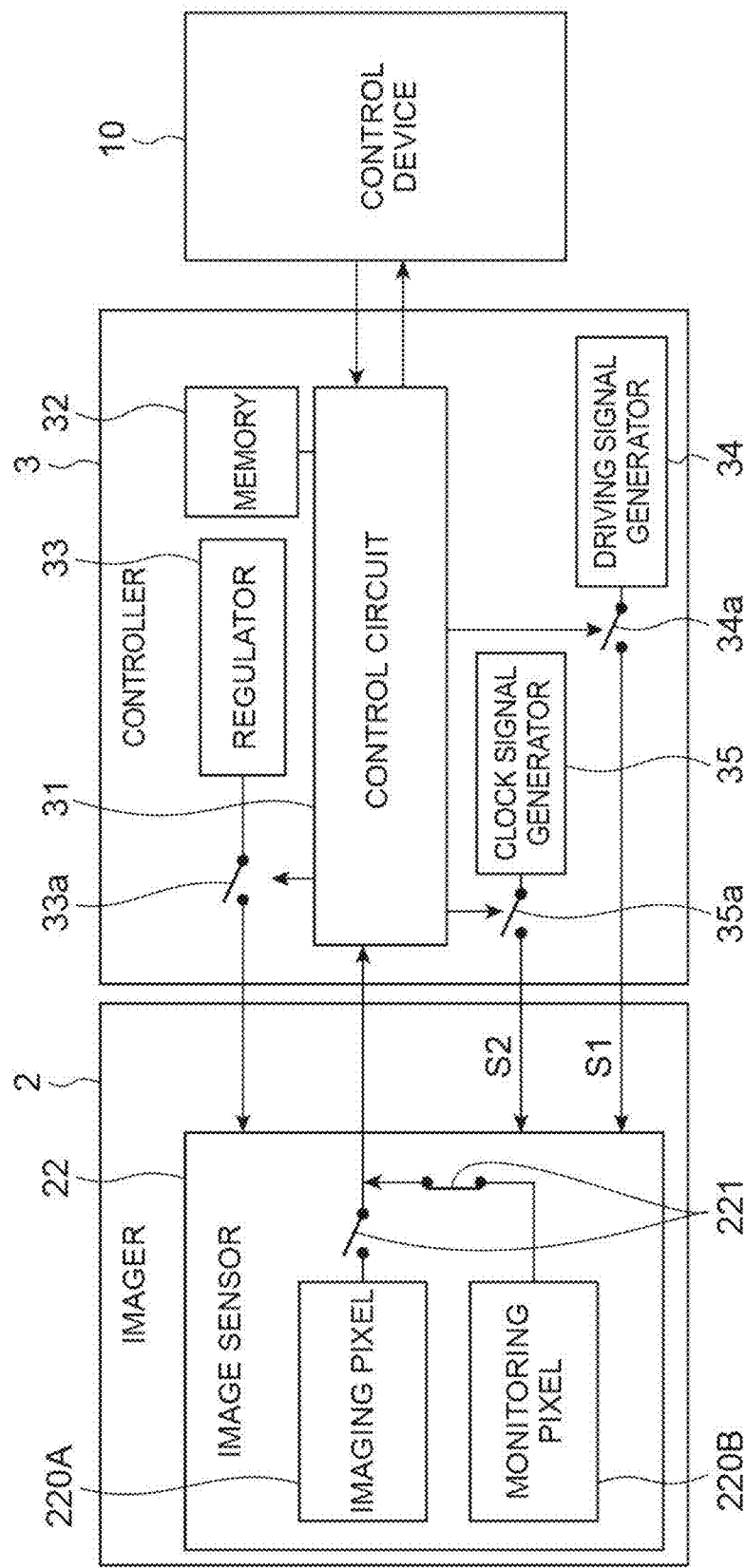
FIG. 3 is a block diagram of an intra-oral imaging device shown in FIG. 1.

As shown in FIG. 3, the controller 3 includes a control circuit 31, a memory 32, a regulator 33, a driving signal generator 34, and a clock signal generator 35. The controller 3 receives power supplied from the control device 10 through, for example, the cable 5 (see FIG. 1). As a result, in the controller 3, the control circuit 31, the regulator 33, the driving signal generator 34, and the clock signal generator are driven.

The control circuit 31 is, for example, an integrated circuit such as an FPGA (field-programmable gate), a CPLD (Complex Programmable Logic Device), or a CPU (Central Processing Unit). The control circuit 31 receives various instructions (to be described later) from the control device 10. The control circuit 31 transmits responses to various instructions to the control device 10. The control circuit 31 receives setting information (to be described later) regarding imaging from the control device 10, and stores the received information in the memory 32.

The control circuit 31 transmits and receives information and the like to and from the imager 2. The control circuit 31 receives an electrical signal from the imager 2 and stores the received electrical signal in the memory 32. The control circuit 31 transmits the electrical signal stored in the memory 32 to the control device 10.

The control circuit 31 controls the driving signal generator 34 and each switch. Specifically, the control circuit 31 controls the generation of a driving signal S1 in the driving signal generator 34. The control circuit 31 controls a switch 33a, a switch 34a, and a switch 35a (to be described later).

The memory 32 stores information received from the control device 10 and an electrical signal received from the imager 2. The memory 32 stores setting information (to be described later) regarding imaging. The setting information is received from the control device 10. The memory 32 stores an electrical signal received from the imager 2. In addition, the memory 32 may be included in the control circuit 31.

The regulator 33 converts a voltage (for example, 5 V) in the supplied power into a voltage with which the image sensor 22 can operate. The regulator 33 supplies power to the image sensor 22 with the converted voltage. The regulator 33 has the switch 33a. The switch 33a performs ON/OFF switching of the supply of power from the regulator 33 to the image sensor 22. In addition, the regulator 33 may be included in the control circuit 31.

The driving signal generator 34 generates the driving signal S1 by using the supplied power. The driving signal generator 34 outputs the generated driving signal S1 to the image sensor 22. The driving signal S1 is formed by a High level signal and a Low level signal. The driving signal generator 34 has the switch 34a. The switch 34a performs ON/OFF switching of the supply of a signal from the driving signal generator 34 to the image sensor 22. In addition, the driving signal generator 34 may be included in the control circuit 31.

The clock signal generator 35 generate a clock signal S2 by using the supplied power. The clock signal generator 35 outputs the generated clock signal S2 to the image sensor 22. The clock signal S2 is a periodic pulse signal for driving the image sensor 22. The clock signal generator 35 has the switch 35a. The switch 35a performs ON/OFF switching of the supply of a signal from the clock signal generator 35 to the image sensor 22. In addition, the clock signal generator 35 may be included in the control circuit 31.

The image sensor 22 of the imager 2 has a plurality of imaging pixels (plurality of pixels for acquiring image of object) 220A and a plurality of monitoring pixels (plurality of pixels for monitoring dose of radiation) 220B. The plurality of imaging pixels 220A are arranged in a two-dimensional manner to form a photodetection region. The plurality of monitoring pixels 220B are arranged, for example, along the periphery of the plurality of imaging pixels 220A. In addition, the number of monitoring pixels 220B only needs to be at least one.

Figure 4:
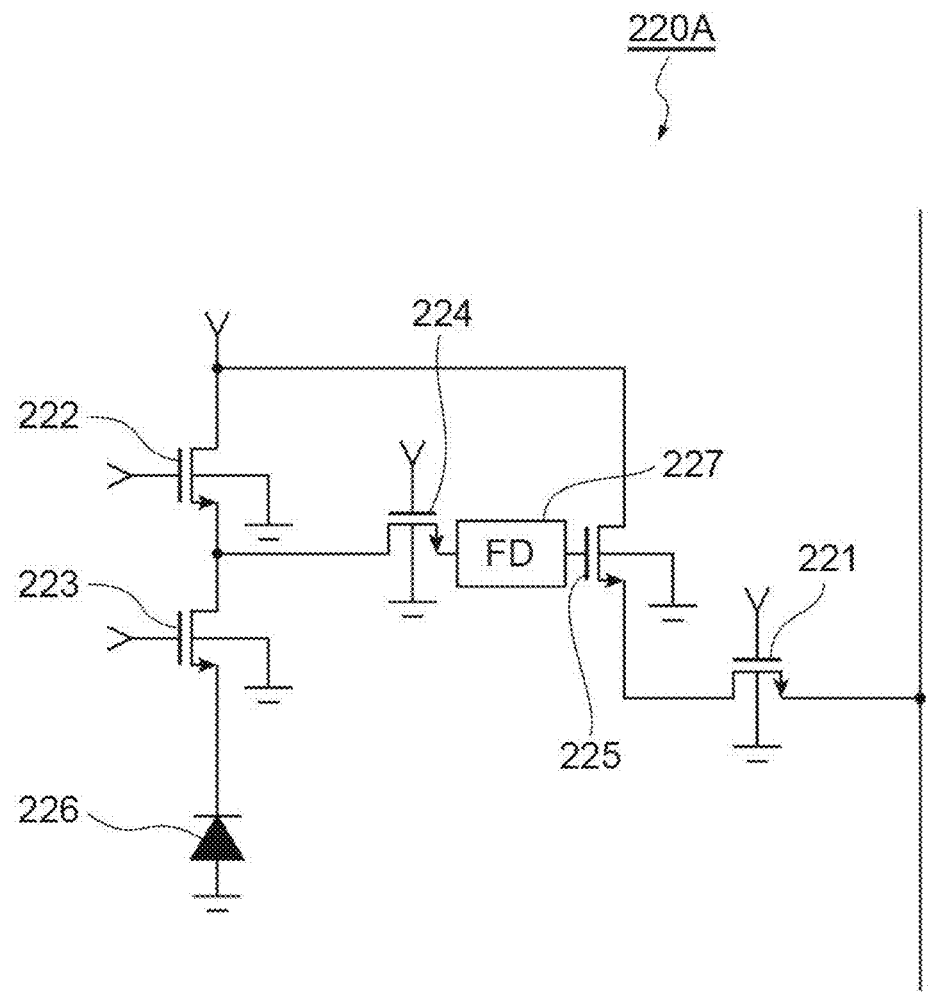
FIG. 4 is a circuit diagram of a pixel included in an image sensor shown in FIG. 3.

As shown in FIG. 4, when radiation is detected, the imaging pixel 220A converts the detected radiation into charges. The imaging pixel 220A accumulates the detected charges. The imaging pixel 220A output an electrical signal corresponding to the accumulated charges. The circuit of the imaging pixel 220A includes a read transistor 221, a reset transistor 222, a charge accumulation control transistor 223, a charge storage transistor 224, a multiplication transistor 225, a photodiode (PD) 226, and a floating diffusion (FD) 227. In addition, the transistors used in FIG. 4 are, for example, MOS-FETs. In addition, since the monitoring pixel 220B has the same configuration as the imaging pixel 220A, the description of the circuit of the imaging pixel 220A will be omitted.

In the imaging pixel 220A, the anode of the PD 226 is grounded. The cathode of the PD 226 is connected to the source of the transistor 223. The drain of the transistor 223 is connected to the source of the transistor 222 and the drain of the transistor 224. The source of the transistor 224 is connected to the FD 227. The drain of the transistor 222 is connected to the drain of the transistor 225. The FD 227 is connected to the gate of the transistor 225. The source of the transistor 225 is connected to the drain of the transistor 221. The source of the transistor 221 is connected to the output of the imaging pixel 220A. In addition, whether or not there is an input signal at the gates of the transistors 221, 222, 223, and 224 is switched according to the driving signal S1 from the driving signal generator 34. A state in which there is an input signal at the gate of the transistor 221 corresponds to a state in which the transistor 221 shown as a switch in FIG. 3 is ON. A state in which there is no input signal at the gate of the transistor 221 corresponds to a state in which the transistor 221 shown as a switch in FIG. 3 is OFF.

The operation of the imaging pixel 220A will be specifically described. Hereinafter, a state in which a transistor is ON means a state in which there is an input signal at the gate of each transistor. When the imaging pixel 220A is initialized, the transistors 222, 223, and 224 are turned on, and the transistor 221 is turned off. Then, the charges accumulated in the PD 226 and the FD 227 are discharged. When charges are accumulated in the imaging pixel 220A, the transistor 223 is turned off. Then, accumulation of the charges generated in the PD 226 is started. When the accumulation of charges in the imaging pixel 220A ends, the transistor 222 is turned off and the transistors 223 and 224 are turned on. Then, the charges accumulated in the PD 226 are transferred to the FD 227. When the transfer of charges is completed in the imaging pixel 220A, the transistor 221 is turned on. Then, when charges are accumulated in the FD 227, the transistor 225 is turned on. As a result, an electrical signal corresponding to the amount of charges accumulated in the FD 227 is output from the imaging pixel 220A to the control circuit 31. When the output of the electrical signal ends in the imaging pixel 220A, the transistors 222 and 224 are turned on, and the transistor 223 is turned off. Then, the charges accumulated in the FD 227 are discharged. In addition, in the imaging pixel 220A, the transistors 221 and 225 are turned on and the transistors 222, 223, and 224 are turned off, so that the accumulation of charges in the PD 226 and the output of the electrical signal can be performed at the same time. In addition, in the imaging pixel 220A, the transistors 222 and 224 are turned on and the transistors 221, 223, and 225 are turned off, so that the accumulation of charges in the PD 226 and the discharge of charges accumulated in the FD 227 can be performed at the same time.

Functions of the control device 10 will be described. The control device 10 transmits and receives information and the like to and from the control circuit 31. Specifically, the control device 10 supplies power to the controller 3. The control device 10 transmits various instructions to the control circuit 31. The control device 10 receives responses to various instructions from the control circuit 31. Here, the various instructions are instructions for causing the control circuit 31 to control the imager 2. For example, an instruction to start an imaging period T1 (to be described later), an instruction to wait for emission of radiation, and an instruction to end the imaging period T1 (to be described later). In addition, the control device 10 transmits setting information regarding imaging to the control circuit 31. The setting information regarding imaging is, for example, information including the time during which charges are accumulated in the imaging pixel 220A (hereinafter, referred to as an accumulation time), the time during which reading is performed in the imaging pixel 220A (hereinafter, referred to as a read time), the number of times indicating how many times imaging is performed in the imaging pixel 220A (hereinafter, referred to as an imaging number), and the time during which imaging is performed in the imaging pixel 220A (hereinafter, referred to as an imaging time) (details will be described later). In addition, the setting information regarding imaging may be set by the user or may be set by the control device 10. In addition, in the present embodiment, the lengths of the accumulation time and the read time are always fixed.

[First Imaging Processing]

Figure 5:
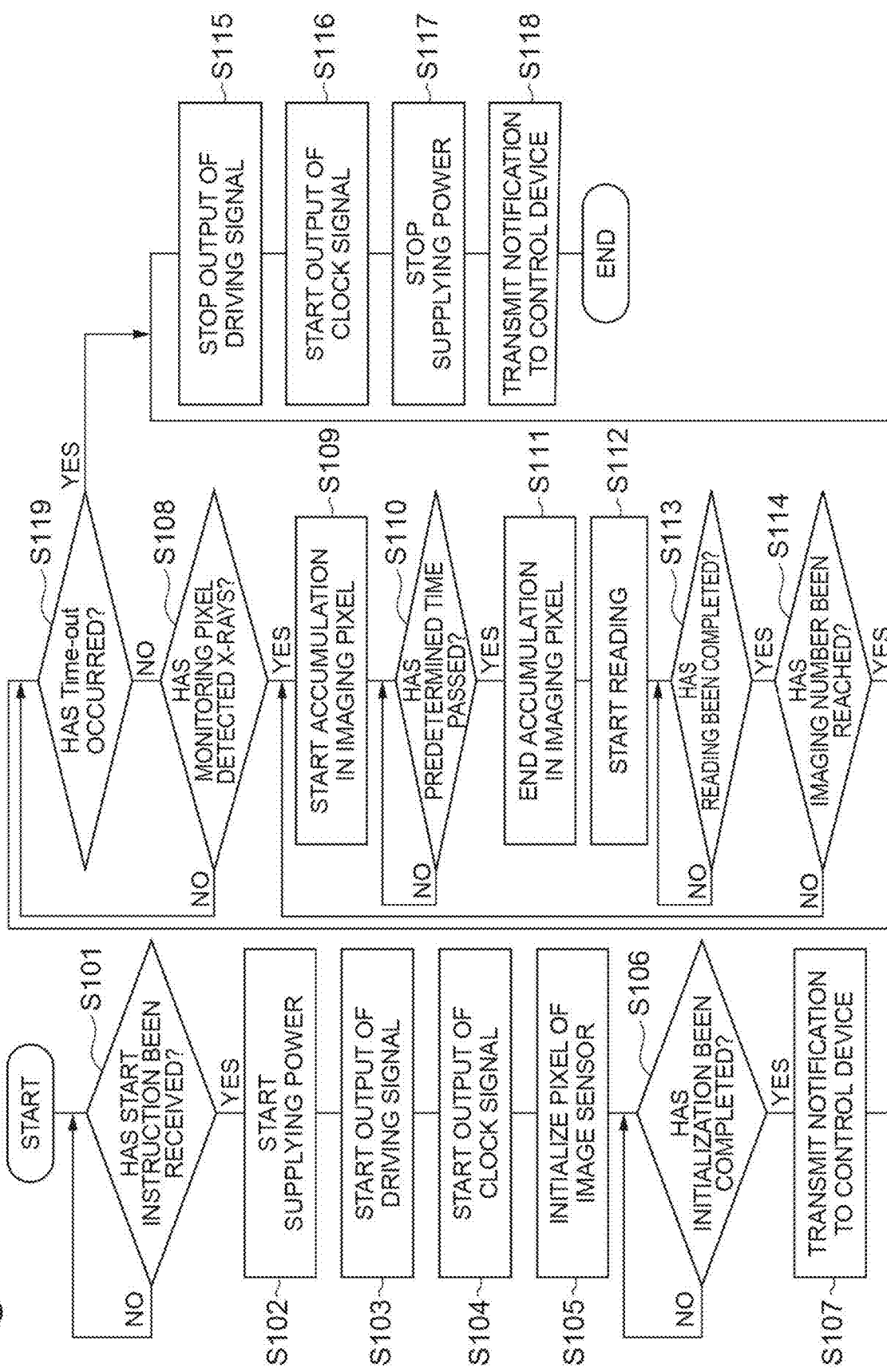
FIG. 5 is a flowchart of imaging processing in a first example.
Figure 6:
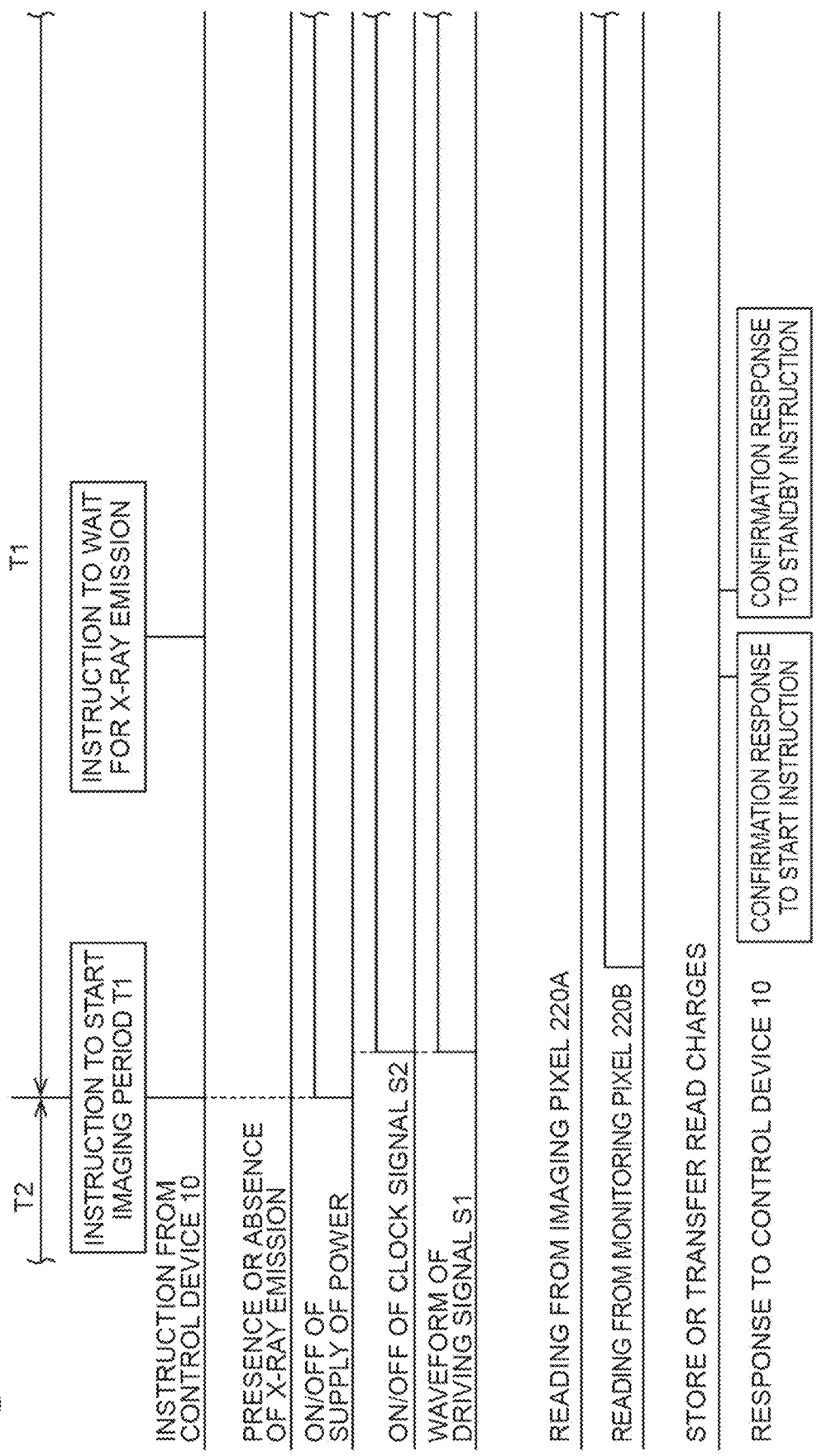
FIG. 6 is a time chart of first imaging processing.
Figure 7:
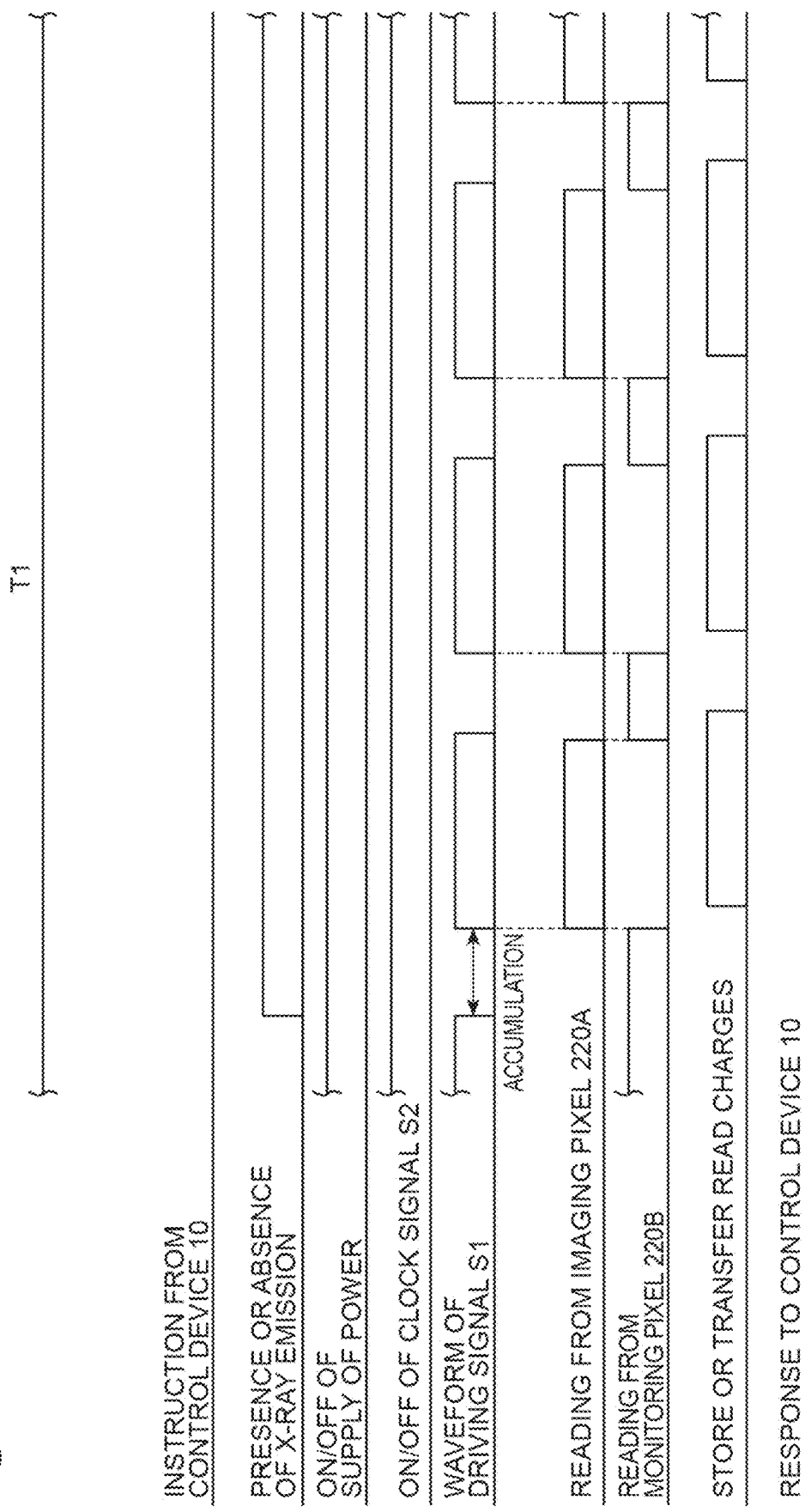
FIG. 7 is a time chart of first imaging processing.
Figure 8:
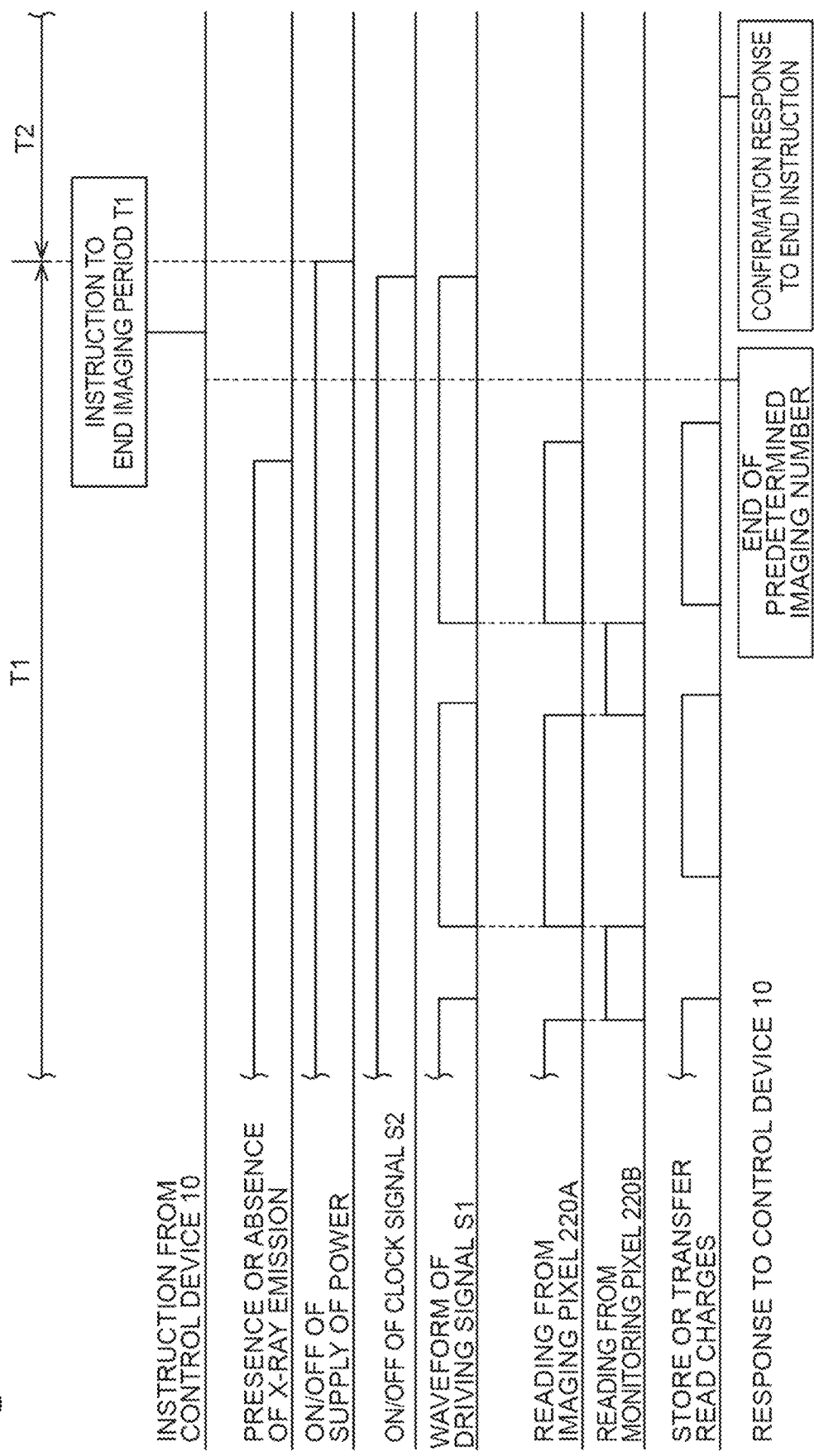
FIG. 8 is a time chart of first imaging processing.

First imaging processing will be described with reference to FIGS. 5 to 8. FIG. 5 is a flowchart of the first imaging processing. FIG. 6 is a time chart at the start of the first imaging processing. FIG. 7 is a time chart during the first imaging processing. FIG. 8 is a time chart at the end of the first imaging processing. In addition, a radiation source in the first imaging processing continuously emits X-rays with a fixed intensity.

In the following description, the accumulation period of the imaging pixel 220A is a period during which detection of radiation in the PD 226 of the imaging pixel 220A, conversion of the detected radiation into charges, and accumulation of the converted charges are performed. In addition, the read period of the imaging pixel 220A is a period during which charges are transferred from the PD 226 to the FD 227 in the imaging pixel 220A, an electrical signal is output, and the charges accumulated in the FD 227 are discharged. In addition, the transfer of charges from the PD 226 to the FD 227 in the imaging pixel 220A is very small compared with the length of the read period. For this reason, this does not appear on the following time chart. In addition, the read period of the monitoring pixel 220B is a period during which the monitoring pixel 220B waits for detection of radiation. When radiation is detected, an electrical signal is immediately output to the control circuit 31.

In addition, the imaging period T1 is a period including a period during which imaging is performed at a predetermined frame rate a predetermined number of times. Imaging refers to an operation from the start of the accumulation period to the end of the read period in one set of accumulation period and read period.

In addition, a standby period T2 is a period between temporally adjacent imaging periods.

In the flowchart shown in FIG. 5, the controller 3 is electrically connected to the control device 10 and the like, so that power is supplied from the control device 10 and the like. First, the control circuit 31 determines whether or not an instruction to start the imaging period T1 has been received from the control device 10 (step S101). If NO in step S101, the process returns to step S101. If YES in step S101, as shown in FIG. 6, the control circuit 31 starts supplying power to the image sensor 22 to start the imaging period T1 (step S102). Specifically, first, the control circuit 31 turns on the switch 33a. Then, power is supplied to the image sensor 22 by the regulator 33. That is, the controller 3 supplies power to the image sensor 22 in the imaging period T1, during which the image sensor 22 performs imaging, while power is being supplied to the controller 3.

Then, as shown in FIG. 6, the control circuit 31 starts supplying the driving signal S1 to the image sensor 22 (step S103). Specifically, the control circuit 31 turns on the switch 34a. Then, the driving signal generator 34 supplies the driving signal S1 to the image sensor 22. The driving signal S1 supplied at this time is a High level signal. That is, the controller 3 supplies the driving signal S1 to the image sensor 22 in the imaging period T1. The controller 3 starts supplying the driving signal S1 to the image sensor 22 after starting supplying the power to the image sensor 22 in the imaging period T1.

Then, as shown in FIG. 6, the control circuit 31 starts supplying the clock signal S2 to the image sensor 22 (step S104). Specifically, the control circuit 31 turns on the switch 35a. Then, the clock signal generator 35 supplies the clock signal S2 to the image sensor 22. That is, the controller 3 supplies the clock signal S2 to the image sensor 22 in the imaging period T1. The controller 3 starts supplying the clock signal S2 to the image sensor 22 after starting supplying the power to the image sensor 22 in the imaging period T1.

Then, the imaging pixel 220A and the monitoring pixel 220B of the image sensor 22 are initialized by the control circuit 31 (step S105). Specifically, the charges accumulated in the PD 226 and FD 227 in the imaging pixel 220A and the monitoring pixel 220B are discharged. Then, as shown in FIG. 6, the control circuit 31 starts a read period of the monitoring pixel 220B. Then, the control circuit 31 determines whether or not the initialization of the imaging pixel 220A and the monitoring pixel 220B of the image sensor 22 has been completed (step S106). If NO in step S106, the process returns to step S106. If YES in step S106, the control circuit 31 transmits a notification to the control device 10 (step S107). Specifically, as shown in FIG. 6, the control circuit 31 transmits to the control device 10 a confirmation response to the instruction to start the imaging period T1. The control device 10 transmits an X-ray emission standby instruction to the control circuit 31. When the standby instruction is received, the control circuit 31 transmits a confirmation response to the standby instruction to the control device 10.

Then, the control circuit 31 determines whether or not a Time-out has occurred (step S119). Specifically, the control circuit 31 determines that a Time-out has occurred when a predetermined time has passed from the reception of a standby instruction. If NO in step S119, the control circuit 31 determines whether or not the monitoring pixel 220B has detected radiation (step S108). If NO in step S108, the process returns to step S119. If YES in step S108, as shown in FIG. 7, the control circuit 31 starts accumulation in the imaging pixel 220A (step S109). Specifically, the control circuit 31 controls the driving signal generator 34 so that the waveform of the driving signal S1 is always a Low level signal. When the image sensor 22 receives the Low level signal, the control circuit 31 controls the imaging pixel 220A to perform accumulation. Then, the control circuit 31 determines whether or not a predetermined time has passed from the start of the accumulation in the imaging pixel 220A (step S110). Specifically, the control circuit 31 compares the accumulation time stored in the memory 32 with the elapsed time from the start of the accumulation in the imaging pixel 220A. When the elapsed time reaches the accumulation time, the control circuit 31 determines that the predetermined time has passed.

Then, as shown in FIG. 7, the control circuit 31 ends the accumulation in the imaging pixel 220A (step S111). Then, the control circuit 31 ends the read period of the monitoring pixel 220B, and starts the read period of the imaging pixel 220A (step S112). Specifically, the control circuit 31 controls the driving signal generator 34 so that the driving signal S1 becomes a High level signal. When the image sensor 22 receives the High level signal, the accumulation is ended in the imaging pixel 220A, and the read period of the imaging pixel 220A is started. At this time, the electrical signal output from the imaging pixel 220A is stored in the memory 32 by the control circuit 31. In addition, the stored electrical signal is transmitted to the control device 10 by the control circuit 31. Then, the control circuit 31 determines whether or not the read period of the imaging pixel 220A has ended (step S113). If NO in step S113, the process returns to step S113.

If YES in step S113, the control circuit 31 determines whether or not the imaging number performed by the image sensor 22 has reached the imaging number set in advance (step S114). If NO in step S114, the process returns to step S109. If YES in step S114 or step S119, the control circuit 31 stops outputting the driving signal S1 (step S115). Specifically, as shown in FIG. 8, when the control circuit 31 determines that the imaging number performed by the image sensor 22 has reached the imaging number set in advance, the control circuit 31 transmits to the control device 10 a notification indicating that the predetermined number of times of imaging has ended. Then, the control device 10 transmits an instruction to end the imaging period to the control circuit 31. In addition, the switch 34a is turned off by the control circuit 31, so that supplying the driving signal S1 to the image sensor 22 is stopped.

Then, the output of the clock signal S2 is stopped by the control circuit 31 (step S116). Specifically, the switch 35a is turned off by the control circuit 31, so that the output of the clock signal S2 to the image sensor 22 is stopped. Then, supplying the power is stopped by the control circuit 31, so that the imaging period T1 ends (step S117). Specifically, the switch 33a is turned off by the control circuit 31, so that supplying the power to the image sensor 22 is stopped. That is, the controller 3 ends supplying the power to the image sensor 22 when the condition of the imaging number set in advance for the imaging period T1 is satisfied. In addition, when imaging is not performed, it is only necessary to end the imaging period T1 reliably. Therefore, the controller 3 may end supplying the power to the image sensor 22 when at least one condition of the imaging number and the imaging time is satisfied. In such a case, at least one of the imaging number and the imaging time is set by the control device 10, transmitted to the controller 3 by the control device 10, received by the controller 3, and stored in the memory 32 by the controller 3. Then, the control circuit 31 ends supplying the power to the image sensor 22 when the imaging number reaches the set imaging number or when the elapsed time from the start of imaging to the present reaches the imaging time.

Finally, the control circuit 31 transmits a confirmation response to the instruction to end the imaging period T1 to the control device 10 (step S118).

In the imaging control in the first imaging processing described above, the control circuit 31 stops supplying the power to the image sensor 22 in the standby period T2. That is, the controller 3 stops supplying the power to the image sensor 22 in the standby period T2.

In addition, in the imaging control in the first imaging processing described above, the control circuit 31 stops supplying the driving signal S1 to the image sensor 22 in the standby period T2. That is, the controller 3 stops supplying the driving signal S1 to the image sensor 22 in the standby period T2.

In addition, in the imaging control in the first imaging processing described above, the control circuit 31 stops supplying the clock signal S2 to the image sensor 22 in the standby period T2. That is, the controller 3 stops supplying the clock signal S2 to the image sensor 22 in the standby period T2.

[Second Imaging Processing]

Figure 9:
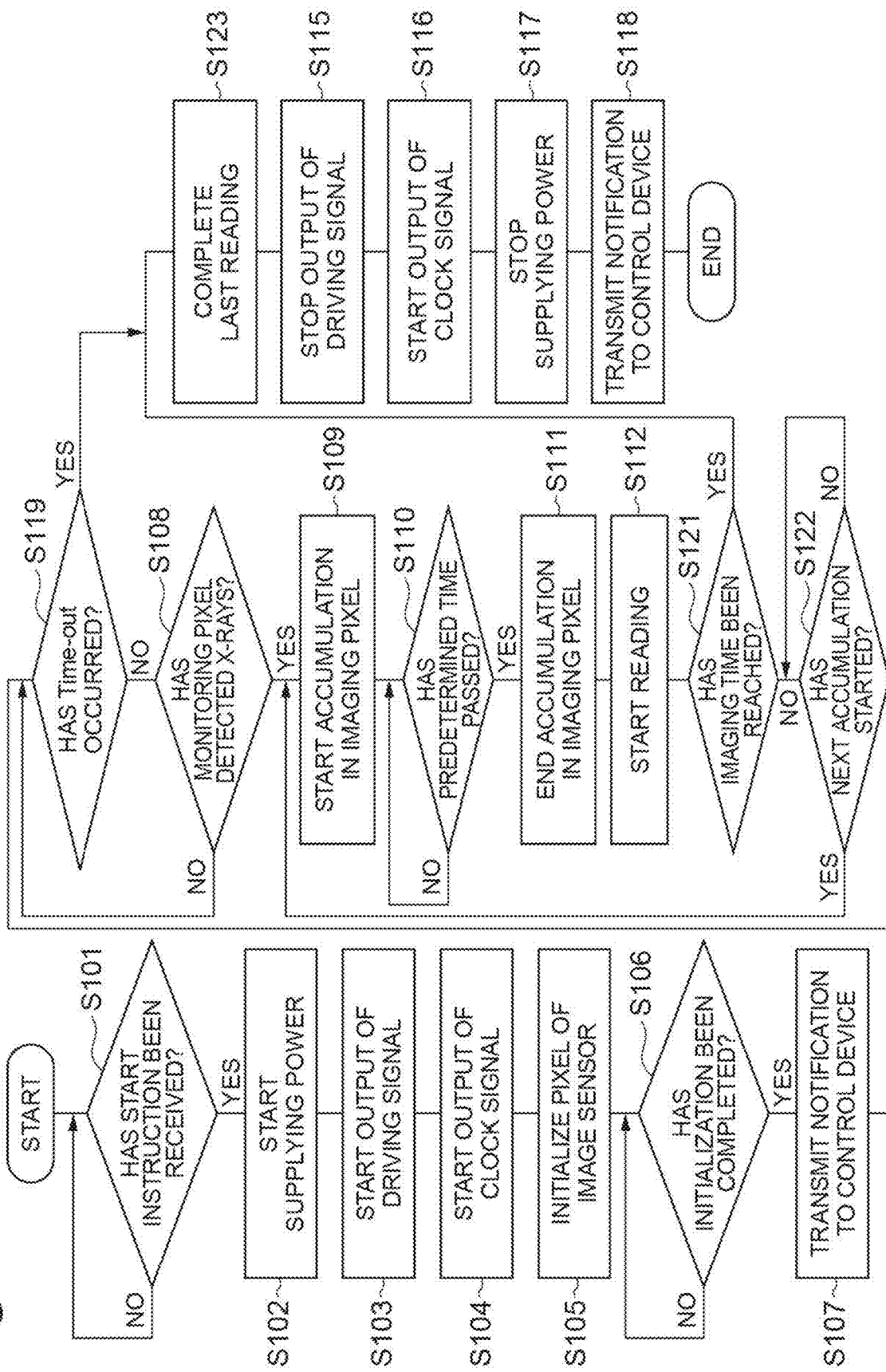
FIG. 9 is a flowchart of second imaging processing.

FIG. 9 is a flowchart of second imaging processing. In the intra-oral imaging device 1 of the second imaging processing, processes shown in steps S120, S121, S122, and S123 shown in FIG. 9 are performed in place of the processes of steps S113 and S114 shown in FIG. 5. In addition, a radiation source in the second imaging processing continuously emits X-rays with a fixed intensity.

Figure 10:
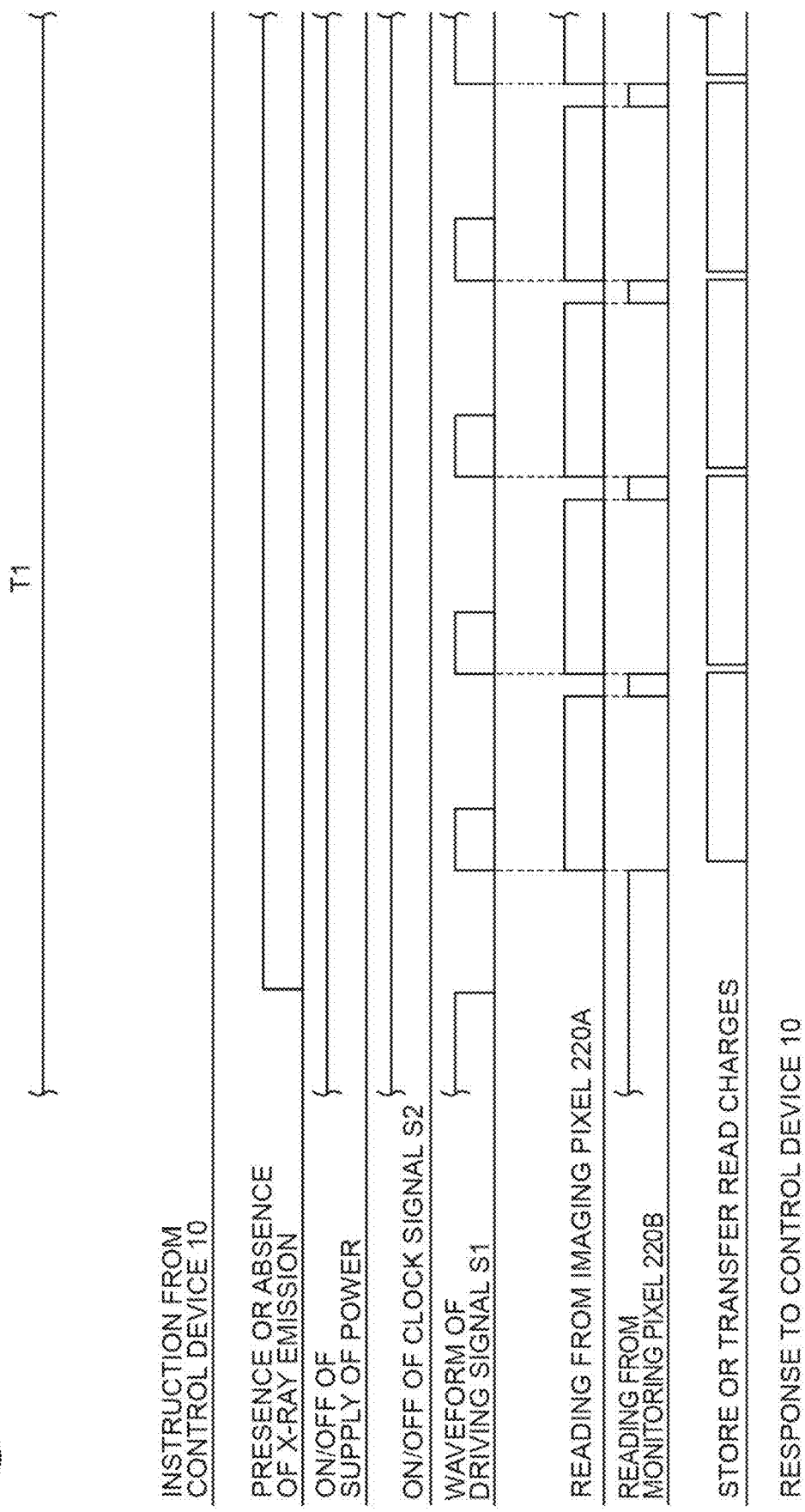
FIG. 10 is a time chart of second imaging processing.

The second imaging processing will be described with reference to FIGS. 9 to 11. The control circuit 31 determines whether or not a Time-out has occurred (step S119). If NO in step S119, the control circuit 31 determines whether or not the monitoring pixel 220B has detected radiation (step S108). If NO in step S108, the process returns to step S119. If YES in step S108, as shown in FIG. 10, the control circuit 31 starts accumulation in the imaging pixel 220A (step S109). Then, the control circuit 31 determines whether or not a predetermined time has passed from the start of accumulation in the imaging pixels 220A (step S110). The accumulation in the imaging pixel 220A is ended by the control circuit 31 (step S111). Then, the control circuit 31 ends the read period of the monitoring pixel 220B, and starts the read period of the imaging pixel 220A (step S112).

Then, the control circuit 31 determines whether or not the time of imaging performed in the image sensor 22 has reached an imaging time set in advance (step S121). Specifically, the control circuit 31 derives the elapsed time from the start of the imaging period T1 to the current time. Then, the control circuit 31 compares the elapsed time with the imaging time. Finally, the control circuit 31 determines whether or not the elapsed time has reached the imaging time.

If NO in step S121, it is determined whether or not this is time to start the next accumulation (step S122). Specifically, first, the control circuit 31 derives the read end time based on the read start time and the read time. Then, the control circuit 31 adds the accumulation time to the current time to estimate the accumulation end time. Then, the control circuit 31 compares the read end time with the accumulation end time. Finally, if the accumulation end time is after the read time, the control circuit 31 determines that the current time is the time to start the next accumulation. If NO in step S122, the process returns to step S122. If YES in step S122, the process returns to step S109.

Figure 11:
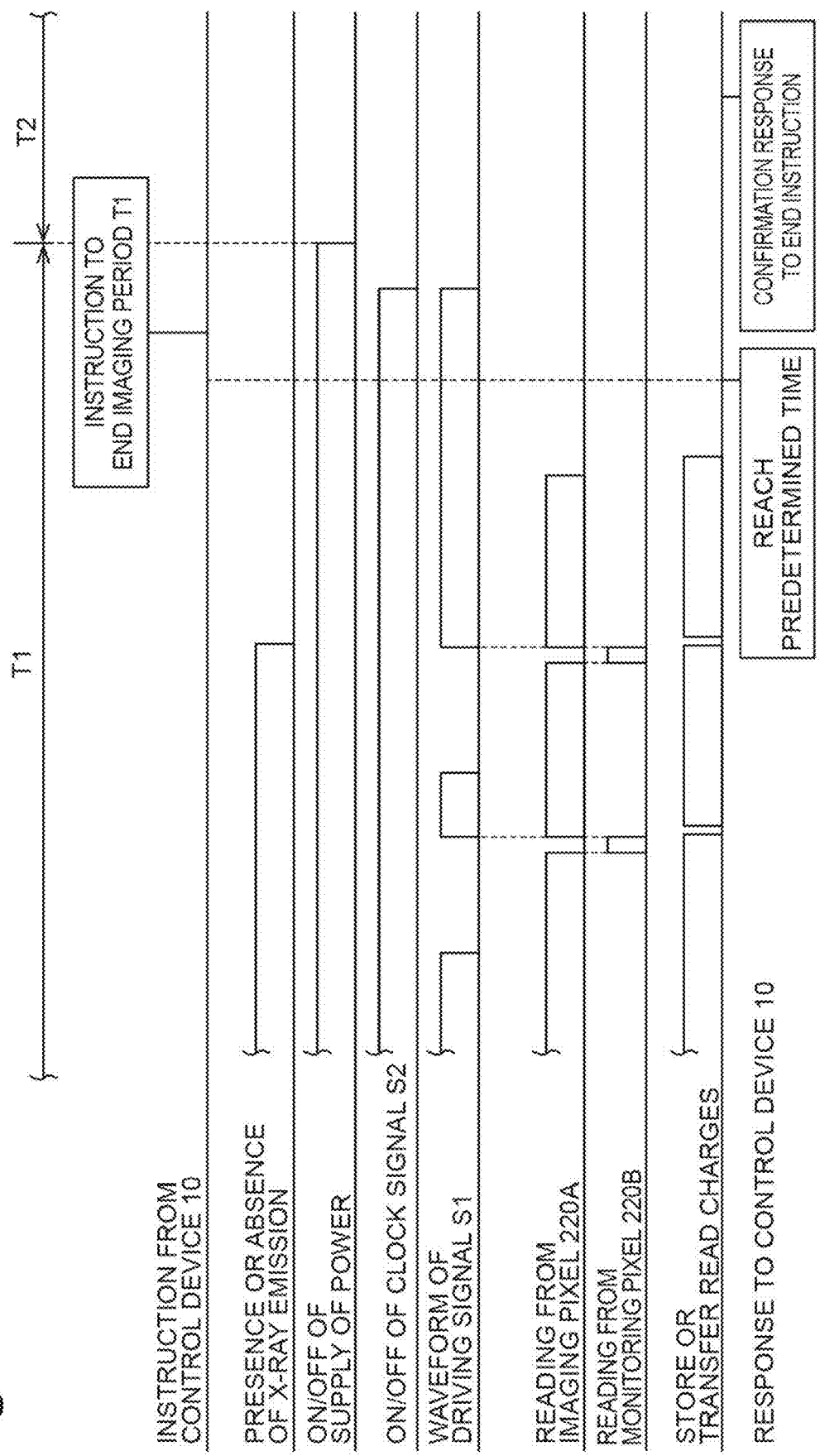
FIG. 11 is a time chart of second imaging processing.

If YES in step S121 or step S119, as shown in FIG. 11, the control circuit 31 confirms the completion of the last reading from the imaging pixel 220A (step S123). Then, the output of the driving signal S1 is stopped by the control circuit 31 (step S115). Specifically, the control circuit 31 transmits to the control device 10 a notification indicating that the predetermined time has been reached. Then, the control device 10 transmits an instruction to end the imaging period to the control circuit 31. In addition, the switch 34a is turned off by the control circuit 31, so that supplying the driving signal S1 to the image sensor 22 is stopped. Then, the output of the clock signal S2 is stopped by the control circuit 31 (step S116). Then, supplying the power is stopped by the control circuit 31, so that the imaging period ends (step S117). Finally, the control circuit 31 transmits a confirmation response to the instruction to end the imaging period T1, to the control device 10 (step S118). That is, the controller 3 ends supplying the power to the image sensor 22 when the imaging time condition is satisfied. In addition, when imaging is not performed, it is only necessary to end the imaging period T1 reliably. Therefore, the controller 3 may end supplying the power to the image sensor 22 when at least one condition of the imaging number and the imaging time is satisfied.

In the imaging control in the second imaging processing described above, the control circuit 31 stops supplying the power to the image sensor 22 in the standby period T2. That is, the controller 3 stops supplying the power to the image sensor 22 in the standby period T2.

In addition, in the imaging control in the second imaging processing described above, the control circuit 31 stops supplying the driving signal S1 to the image sensor 22 in the standby period T2. That is, the controller 3 stops supplying the driving signal S1 to the image sensor 22 in the standby period T2.

In addition, in the imaging control in the second imaging processing described above, the control circuit 31 stops supplying the clock signal S2 to the image sensor 22 in the standby period T2. That is, the controller 3 stops supplying the clock signal S2 to the image sensor 22 in the standby period T2.

[Third Imaging Processing]

Then, a radiation source in third imaging processing emits a pulse wave at predetermined cycles when capturing a transmission image. Then, the pulse wave emission cycle is set in advance by the control device 10 or the user so as to be longer than the sum of the accumulation time and the read time described above.

Figure 12:
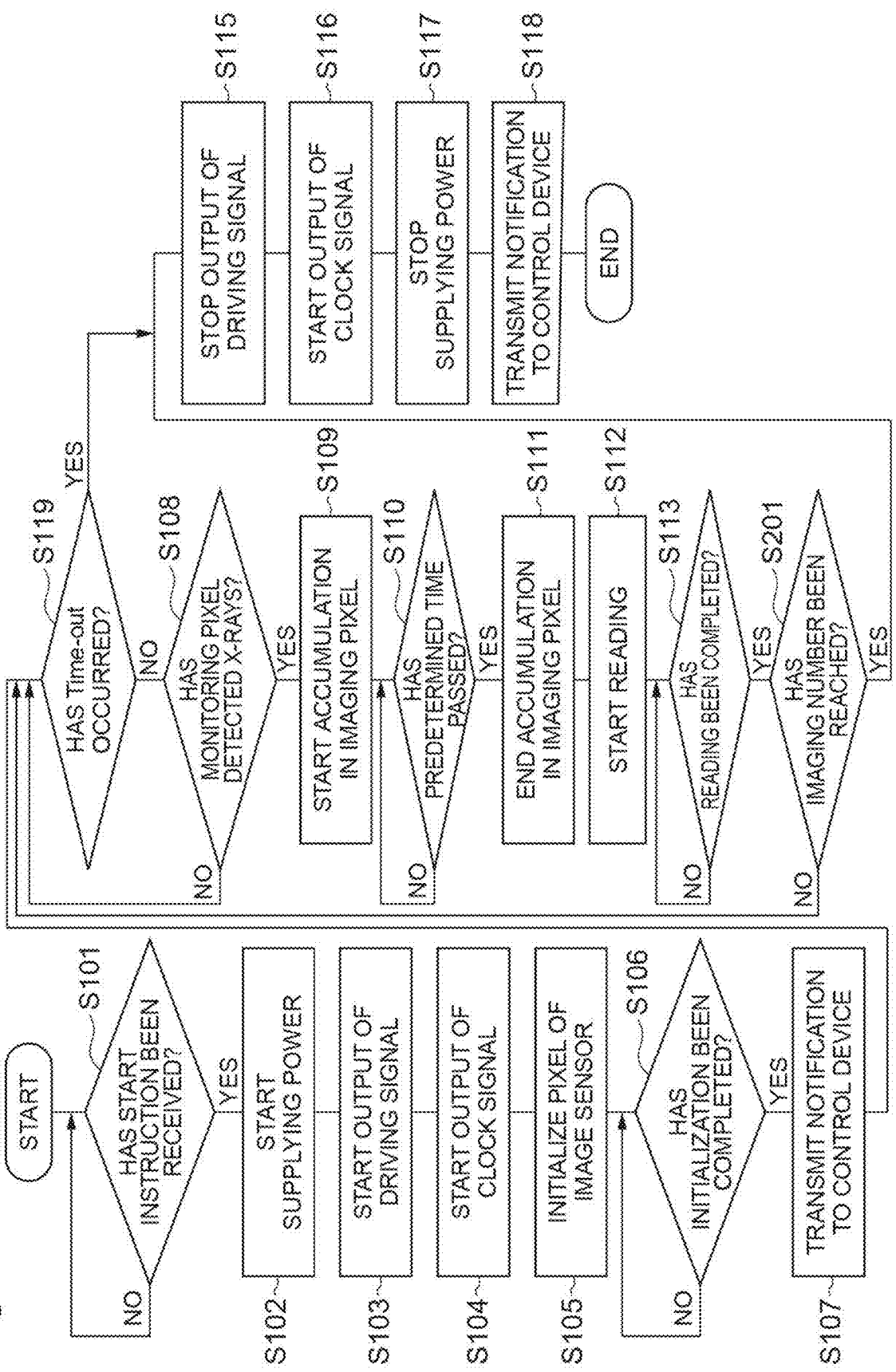
FIG. 12 is a flowchart of third imaging processing.

FIG. 12 is a flowchart showing imaging control in the third imaging processing. In the intra-oral imaging device 1 of the third imaging processing, a process shown in step S201 shown in FIG. 12 is performed in place of the process of step S114 shown in FIG. 5.

The third imaging processing will be described with reference to FIGS. 12 to 14. The control circuit 31 determines whether or not a Time-out has occurred (step S119). If NO in step S119, the control circuit 31 determines whether or not the monitoring pixel 220B has detected radiation (step S108). If NO in step S108, the process returns to step S119. If YES in step S108, as shown in FIG. 13, the control circuit 31 starts accumulation in the imaging pixel 220A (step S109). Then, the control circuit 31 determines whether or not a predetermined time has passed from the start of accumulation in the imaging pixels 220A (step S110). The accumulation in the imaging pixel 220A is ended by the control circuit 31 (step S111). Then, the control circuit 31 ends the read period of the monitoring pixel 220B, and starts the read period of the imaging pixel 220A (step S112). Then, the control circuit 31 determines whether or not reading from the imaging pixel 220A has been completed (step S113). If NO in step S113, the process returns to step S113. If YES in step S113, the control circuit 31 determines whether or not the imaging number performed by the image sensor 22 has reached the imaging number set in advance (step S201). If NO in step S201, the process returns to step S119. In addition, when returning from step S201 to step S119, in step S119, the control circuit 31 determines that a Time-out has occurred when a predetermined time has passed from the last X-ray detection by the monitoring pixel 220B.

If YES in step S201 or step S119, as shown in FIG. 14, the control circuit 31 stops outputting the driving signal S1 (step S115). Then, the output of the clock signal S2 is stopped by the control circuit 31 (step S116). Then, supplying the power is stopped by the control circuit 31, so that the imaging period T1 ends (step S117). That is, the controller 3 ends supplying the power to the image sensor 22 when the condition of the imaging number set for the imaging period T1 is satisfied. In addition, when imaging is not performed, it is only necessary to end the imaging period T1 reliably. Therefore, the controller 3 may end supplying the power to the image sensor 22 when at least one condition of the imaging number and the imaging time is satisfied.

Finally, the control circuit 31 transmits a confirmation response to the instruction to end the imaging period T1 to the control device 10 (step S118).

In the imaging control in the third imaging processing described above, the control circuit 31 stops supplying the power to the image sensor 22 in the standby period T2. That is, the controller 3 stops supplying the power to the image sensor 22 in the standby period T2.

In addition, in the imaging control in the third imaging processing described above, the control circuit 31 stops supplying the driving signal S1 to the image sensor 22 in the standby period T2. That is, the controller 3 stops supplying the driving signal S1 to the image sensor 22 in the standby period T2.

In addition, in the imaging control in the third imaging processing described above, the control circuit 31 stops supplying the clock signal S2 to the image sensor 22 in the standby period T2. That is, the controller 3 stops supplying the clock signal S2 to the image sensor 22 in the standby period T2.

[Functions and Effects]

As described above, in the intra-oral imaging device 1, power is supplied to the image sensor 22 of the imager 2 in the imaging period T1, and supplying the power to the image sensor 22 of the imager 2 is stopped in the standby period T2. Therefore, the time during which power is supplied to the image sensor 22 of the imager 2 is reduced as compared with a case where power is supplied to the image sensor 22 over the imaging period T1 and the standby period T2. For this reason, for example, even when imaging is performed at a high frame rate in the imaging period T1, heat generation of the image sensor 22 is suppressed as compared with a case where power is supplied to the image sensor 22 over the imaging period T1 and the standby period T2. In addition, since the controller 3 to which power is supplied over the imaging period T1 and the standby period T2 is placed outside the oral cavity, the imager 2 is less likely to be affected by the heat generated by the controller 3. Therefore, according to the intra-oral imaging device 1, for example, even when imaging is performed at a high frame rate, it is possible to suppress an increase in the temperature of the imager 2 placed in the oral cavity.

In the intra-oral imaging device 1, the controller 3 outputs the driving signal S1 to the image sensor 22 in the imaging period T1, and stops supplying the driving signal S1 to the image sensor 22 in the standby period T2. Therefore, the time during which the driving signal S1 is supplied to the image sensor 22 of the imager 2 is reduced as compared with a case where the driving signal S1 is supplied to the image sensor 22 over the imaging period T1 and the standby period T2. As a result, since the heat generation of the image sensor 22 is more reliably suppressed, it is possible to suppress an increase in the temperature of the imager 2 more reliably.

In the intra-oral imaging device 1, the controller 3 starts outputting the driving signal S1 to the image sensor 22 after starting supplying the power to the image sensor 22 in the imaging period T1. Therefore, it is possible to suppress an increase in the load caused by simultaneously starting supplying the power to the image sensor 22 and the output of the driving signal S1 to the image sensor 22.

In the intra-oral imaging device 1, the controller 3 outputs the clock signal S2 to the image sensor 22 in the imaging period T1, and stops supplying the clock signal S2 to the image sensor 22 in the standby period T2. Therefore, the time during which the clock signal S2 is supplied to the image sensor 22 of the imager 2 is reduced as compared with a case where the clock signal S2 is supplied to the image sensor over the imaging period T1 and the standby period T2. As a result, since the heat generation of the image sensor 22 is more reliably suppressed, it is possible to suppress an increase in the temperature of the imager 2 more reliably.

In the intra-oral imaging device 1, the controller 3 starts outputting the clock signal S2 to the image sensor 22 after starting supplying the power to the image sensor 22 in the imaging period T1. Therefore, it is possible to suppress an increase in the load caused by simultaneously starting supplying the power to the image sensor 22 and the output of the driving signal S1 to the image sensor 22.

In the intra-oral imaging device 1, supplying the power to the image sensor 22, supplying the driving signal S1 to the image sensor 22, and supplying the clock signal S2 to the image sensor 22 are stopped in the standby period T2. Therefore, since there is no electrical input to the image sensor 22 in the standby period T2, heat generation of the image sensor 22 in the standby period T2 can be completely suppressed. As a result, since the heat generation of the image sensor 22 is more reliably suppressed, it is possible to suppress an increase in the temperature of the imager 2 more reliably.

In the intra-oral imaging device 1, supplying the power to the image sensor 22, supplying the driving signal S1 to the image sensor 22, and supplying the clock signal S2 to the image sensor 22 are not performed until the controller 3 receives an instruction to start the imaging period T1. Therefore, as compared with a case where the clock signal S2 is supplied to the image sensor 22 over the imaging period T1 and the standby period T2, for example, even when imaging is not started even though the user has connected the control device 10 and the controller 3 to each other, it is possible to suppress an increase in the temperature of the imager 2 by suppressing the heat generation of the image sensor 22.

In the intra-oral imaging device 1, the controller 3 ends supplying the power to the image sensor 22 when at least one condition of the imaging number and the imaging time set in advance for the imaging period T1 is satisfied. Therefore, for example, even if no operation or control is performed by the user or the control device 10 or the like, it is possible to reliably end supplying the power to the image sensor 22 when the imaging period T1 ends. For this reason, for example, even if the user forgets to stop supplying the power to the intra-oral imaging device 1, it is possible to suppress an increase in the temperature of the imager 2 by suppressing the heat generation of the image sensor 22.

In the intra-oral imaging device 1, the image sensor 22 further includes monitoring pixel 220B for monitoring the dose of radiation. For example, when the monitoring pixel 220B is provided in a light receiving element different from the image sensor 22, the controller 3 needs to have a function of separately supplying power not only to the image sensor 22 but also to the light receiving element and a function of separately controlling supplying the power to the light receiving element. Since the image sensor 22 includes the monitoring pixel 220B for monitoring the dose of radiation, such a separate function is not required. Therefore, the configuration and operation of the controller 3 can be further simplified.

In the intra-oral imaging device 1 of the second imaging processing, when performing reading in the imaging pixel 220A, the control circuit 31 starts the next accumulation without waiting for the end of the reading. This reduces the time difference between the end time of accumulation and the start time of the next accumulation. As a result, imaging can be performed at a higher frame rate.

In the intra-oral imaging device 1 of the third imaging processing, an X-ray source that emits pulse waves at fixed cycles emits X-rays. Therefore, it is possible to minimize the exposure dose of the patient or the user. In addition, by reducing the time during which the image sensor 22 is exposed to X-rays, the deterioration speed of the imager 2 can be slowed down.

Modification Examples

While the embodiment of the present disclosure has been described above, the present disclosure is not limited to the above embodiment. For example, the control circuit 31 may include the regulator 33 because power only needs to be supplied from the controller 3 to the imager 2. In such a case, the control circuit 31 converts the voltage in the power from the control device 10 into a voltage with which the image sensor 22 can be driven, and power is supplied to the image sensor 22 with the converted voltage.

In addition, in the embodiment of the present disclosure, the control circuit 31 may include the driving signal generator 34 because the driving signal S1 only needs to be supplied from the controller 3 to the imager 2. In such a case, the control circuit 31 generates the driving signal S1 and outputs the driving signal S1 to the image sensor 22. As a result, it is possible to simplify the configuration of the controller 3.

In addition, in the embodiment of the present disclosure, the control circuit 31 may include the clock signal generator 35 because the clock signal S2 only needs to be supplied from the controller 3 to the imager 2. In such a case, the control circuit 31 generates the clock signal S2 and outputs the clock signal S2 to the image sensor 22. As a result, it is possible to simplify the configuration of the controller 3.

In addition, in the embodiment of the present disclosure, information only needs to be transmitted and received between the control device 10 and the controller 3. Therefore, the control device 10 and the controller 3 may communicate with each other wirelessly (for example, through LAN, Bluetooth (registered trademark), or Wifi).

In addition, in the embodiment of the present disclosure, information only needs to be transmitted and received between the imager 2 and the controller 3. Therefore, the imager 2 and the controller 3 may communicate with each other wirelessly (for example, through LAN, Bluetooth (registered trademark), or Wifi). However, when performing wireless communication, the imager 2 and the controller 3 need to further include transmitting and receiving devices for wireless communication, and power should always be supplied to the devices. Therefore, it is preferable that the imager 2 and the controller 3 communicate with each other by wire. According to such a configuration, the supply of power to the imager 2 can be minimized while simplifying the configuration of the imager 2 and the controller 3 as compared with the case of wireless communication.

In addition, in the embodiment of the present disclosure, the controller 3 only needs to receive the supply of power. For example, the controller 3 may receive the supply of power through an outlet or the like, or may receive the supply of power wirelessly.

In addition, in the embodiment of the present disclosure, an instruction to start the imaging period T1 and an instruction to wait for X-ray emission may be given at the same time. In such a case, the controller 3 may transmit a response to the instruction to start the imaging period T1 and the instruction to wait for X-ray emission to the control device 10 once. As a result, it is possible to simplify the operation of the controller 3.

In addition, the control circuit 31 of the embodiment of the present disclosure may stop supplying the power to the image sensor 22 based on reading from the monitoring pixel 220B. According to this, the control circuit 31 can stop supplying the power to the image sensor 22, for example, when it is determined that there is no reading from the monitoring pixel 220B and the X-ray emission has ended. In addition, for example, even if no operation or control is performed by the user or the control device 10, it is possible to reliably end supplying the power to the image sensor 22. As described above, it is possible to suppress an increase in the temperature of the imager 2 by suppressing the heat generation of the image sensor 22.

In addition, the imager 2 of the embodiment of the present disclosure may have a light receiving element including the monitoring pixel 220B that is a pixel for monitoring the dose of radiation. According to this, since the heat generation of the light receiving element can be sufficiently suppressed, the heat generation of the image sensor 22 can be reliably suppressed, for example, by supplying power or a signal to the image sensor 22 only when radiation is emitted while constantly supplying power to the light receiving element to monitor the dose of radiation. In such a case, the controller 3 has a function of controlling supplying the power to the light receiving element.

In addition, the start time of the imaging period T1 in the embodiment of the present disclosure may be earlier or later than the start of supplying the power to the image sensor 22, the start time of supplying the driving signal S1 to the image sensor 22, the start time of supplying the clock signal S2 to the image sensor 22, the read start time of the monitoring pixel 220B, an instruction to start the imaging period T1 from the control device 10, an X-ray emission standby instruction from the control device 10, a confirmation response to the start instruction, a confirmation response to the standby instruction, and the start time of X-ray emission.

The end time of the imaging period T1 may be earlier or later than the end of supplying the power to the image sensor 22, the end time of supplying the driving signal S1 to the image sensor 22, the end time of supplying the clock signal S2 to the image sensor 22, an instruction to end the imaging period T1 from the control device 10, a confirmation response to the end instruction, a response to the control device 10 regarding the end of a predetermined imaging number, and the end time of X-ray emission.

In addition, the start time of the standby period T2 in the embodiment of the present disclosure may be earlier or later than the end time of supplying the driving signal S1 to the image sensor 22, the end time of supplying the clock signal S2 to the image sensor 22, a confirmation response to the end instruction, and the end time of X-ray emission.

In addition, in the embodiment of the present disclosure, by synchronizing the driving of the X-ray source and the driving of the image sensor 22 with each other, it becomes unnecessary to detect whether or not X-rays have been emitted. Therefore, the monitoring pixel 220B is not an essential component. As a result, it is possible to simplify the configuration of the imager 2.

In addition, in the embodiment of the present disclosure, the electrical signal output from the image sensor 22 only needs to be finally transmitted to the control device 10 to generate a transmission image. Therefore, the controller 3 may not have the memory 32. In such a case, the control circuit 31 immediately transmits the electrical signal output from the image sensor 22 to the control device 10.

In addition, in the embodiment of the present disclosure, when counting the imaging number, assuming that a combination of one accumulation period and one read period in the imaging pixel 220A is one set, it is only necessary to know how many sets of such combinations there are from the start of the imaging period T1 to the current time. Therefore, when counting the imaging number, the number of accumulation periods may be counted, or the number of read periods may be counted.

In addition, in the embodiment of the present disclosure, when the control circuit 31 does not perform imaging, the imaging only needs to be ended. Therefore, the imaging time only needs to be a criterion for determining whether or not to end imaging by the control circuit 31. Specifically, the imaging time is set in advance by the control device 10, an elapsed time after the control circuit 31 determines that the predetermined imaging number has ended is compared with the imaging time in each imaging processing by the control circuit 31, and steps S115 to S118 that are processes for ending the imaging may be executed when the elapsed time reaches the imaging time. Therefore, for example, the control circuit 31 can stop supplying the power to the image sensor 22 without any operation by the user or the control device 10. As a result, since the heat generation of the image sensor 22 is more reliably suppressed, it is possible to suppress an increase in the temperature of the imager 2 more reliably.

In addition, the elapsed time may be an elapsed time after reading from the imaging pixel 220A finally ends. Therefore, for example, even if the imaging processing is delayed due to an error or the like, the control circuit 31 can stop supplying the power to the image sensor 22. As a result, since the heat generation of the image sensor 22 is more reliably suppressed, it is possible to suppress an increase in the temperature of the imager 2 more reliably.

In addition, the accumulation time in the embodiment of the present disclosure may be derived by the control device 10. Specifically, the control device 10 analyzes in advance the electrical signal output from the monitoring pixel 220B, and sets the time (accumulation time) during which charges are accumulated in the imaging pixel 220A based on the analysis result. As an example, the control device 10 stores in advance the correlation between the dose of X-rays per unit time (hereinafter, referred to as a dose rate) and the output from the monitoring pixel 220B. First, the control device 10 receives the output from the monitoring pixel 220B as an electrical signal when X-rays are emitted. Then, the control device 10 derives the dose rate in the monitoring pixel 220B by applying the above correlation to the received output from the monitoring pixel 220B. Then, the control device 10 estimates the dose rate received by the imaging pixel 220A from the derived dose rate. Here, the control device 10 sets in advance a threshold value of the dose at which the imaging pixel 220A is not saturated. In addition, based on the set threshold value of the dose, the control device 10 sets the accumulation time from the estimated dose rate so that the imaging pixel 220A is not saturated. The control device 10 transmits the information of the set accumulation time to the controller 3.

In addition, the read time in the embodiment of the present disclosure may be set according to the accumulation time derived by the control device 10. Specifically, the control device 10 derives the dose received by the imaging pixel 220A when the accumulation time in the imaging pixel 220A ends. The control device 10 derives the accumulated charge amount from the dose received by the imaging pixel 220A. The control device 10 derives, from the derived charge amount, the total time required for the output of the electrical signal in the imaging pixel 220A and the discharge of the charges accumulated in the FD 227. The control device 10 sets the derived total time as the read time. The control device 10 transmits the information of the set read time to the controller 3.

REFERENCE SIGNS LIST

1: intra-oral imaging device, 2: imager, 3: controller, 22: image sensor, S1: driving signal, S2: clock signal, 220A: imaging pixel (plurality of pixels for acquiring image of object), 220B: monitoring pixel (pixel for monitoring dose of radiation), T1: imaging period, T2: standby period.

The invention claimed is:

1. An intra-oral imaging device, comprising:
an imager that detects radiation transmitted through an object while being placed in an oral cavity; and
a controller that controls the imager while being placed outside the oral cavity,
wherein the imager includes:
(i) an image sensor including a plurality of imaging pixels for acquiring an image of the object and a monitoring pixel for monitoring a dose of the radiation; or
(ii) an image sensor including a plurality of imaging pixels for acquiring an image of the object and a light receiving element including a monitoring pixel for monitoring a dose of the radiation, and
while power is being supplied to the controller, the controller supplies power to the image sensor in an imaging period during which the image sensor performs imaging and while power is being supplied to the controller, the controller stops supplying the power to the image sensor in a standby period during which the image sensor is on standby.

2. The intra-oral imaging device according to claim 1, wherein the controller outputs a driving signal to the image sensor in the imaging period and stops supplying the driving signal to the image sensor in the standby period.

3. The intra-oral imaging device according to claim 2, wherein the controller starts outputting the driving signal to the image sensor after starting supplying the power to the image sensor in the imaging period.

4. The intra-oral imaging device according to claim 1, wherein the controller outputs a clock signal to the image sensor in the imaging period and stops supplying the clock signal to the image sensor in the standby period.

5. The intra-oral imaging device according to claim 4, wherein the controller starts outputting the clock signal to the image sensor after starting supplying the power to the image sensor in the imaging period.

6. The intra-oral imaging device according to claim 1, wherein the controller ends supplying the power to the image sensor when at least one condition of an imaging number and an imaging time set for the imaging period is satisfied.

* * * * *